United States Patent
Gausepohl et al.

[11] Patent Number: 5,902,865
[45] Date of Patent: May 11, 1999

[54] PREPARATION OF POLYSTYRENE BY CONTINUOUS ANIONIC POLYMERIZATION

[75] Inventors: Hermann Gausepohl, Mutterstadt; Wolfgang Fischer, Ludwigshafen; Wolfgang Loth, Bad Dürkheim; Reiner Thiele, Kaiserslautern, all of Germany

[73] Assignee: BASF Aktiengesellschaft, Ludwigshafen, Germany

[21] Appl. No.: 08/851,353

[22] Filed: May 6, 1997

[30] Foreign Application Priority Data

May 9, 1996 [DE] Germany .................. 196 18 678

[51] Int. Cl.⁶ .................. C08F 12/08; C08F 2/06
[52] U.S. Cl. .................. 526/64; 526/65; 526/88; 526/173; 526/346
[58] Field of Search .................. 526/64, 65, 88, 526/173, 346

[56] References Cited

U.S. PATENT DOCUMENTS

| | | |
|---|---|---|
| 3,035,033 | 5/1962 | Kenmore et al. . |
| 4,200,713 | 4/1980 | Wingler et al. .................. 526/64 |
| 4,209,599 | 6/1980 | Brady et al. .................. 526/64 |
| 4,442,273 | 4/1984 | Neiditch et al. . |
| 5,194,525 | 3/1993 | Miura et al. .................. 526/64 |

FOREIGN PATENT DOCUMENTS

| | | |
|---|---|---|
| 176 611 | 4/1986 | European Pat. Off. . |
| 307 238 | 3/1989 | European Pat. Off. . |
| 373 883 | 6/1990 | European Pat. Off. . |
| 42 35 980 | 4/1994 | Germany . |
| 43 27 405 | 1/1995 | Germany . |

*Primary Examiner*—Fred Teskin
*Attorney, Agent, or Firm*—Keil & Weinkauf

[57] ABSTRACT

In a process for preparing polystyrene by continuous anionic polymerization of styrene monomer by means of a catalyst based on a metal alkyl preferably in the presence of a solvent at a temperature in the range from 30 to 70° C., the styrene monomer is fed to an essentially isothermally operated circulation reactor configured as a closed tube loop which has, for example, a specific cooling area of at least 50 m² per m³ of reactor volume, with the circulation velocity of the reaction mixture and the residence time being set such that the monomer conversion reaches at least 50% and the polymerization is completed in an essentially backmixing-free tube reactor.

5 Claims, 1 Drawing Sheet

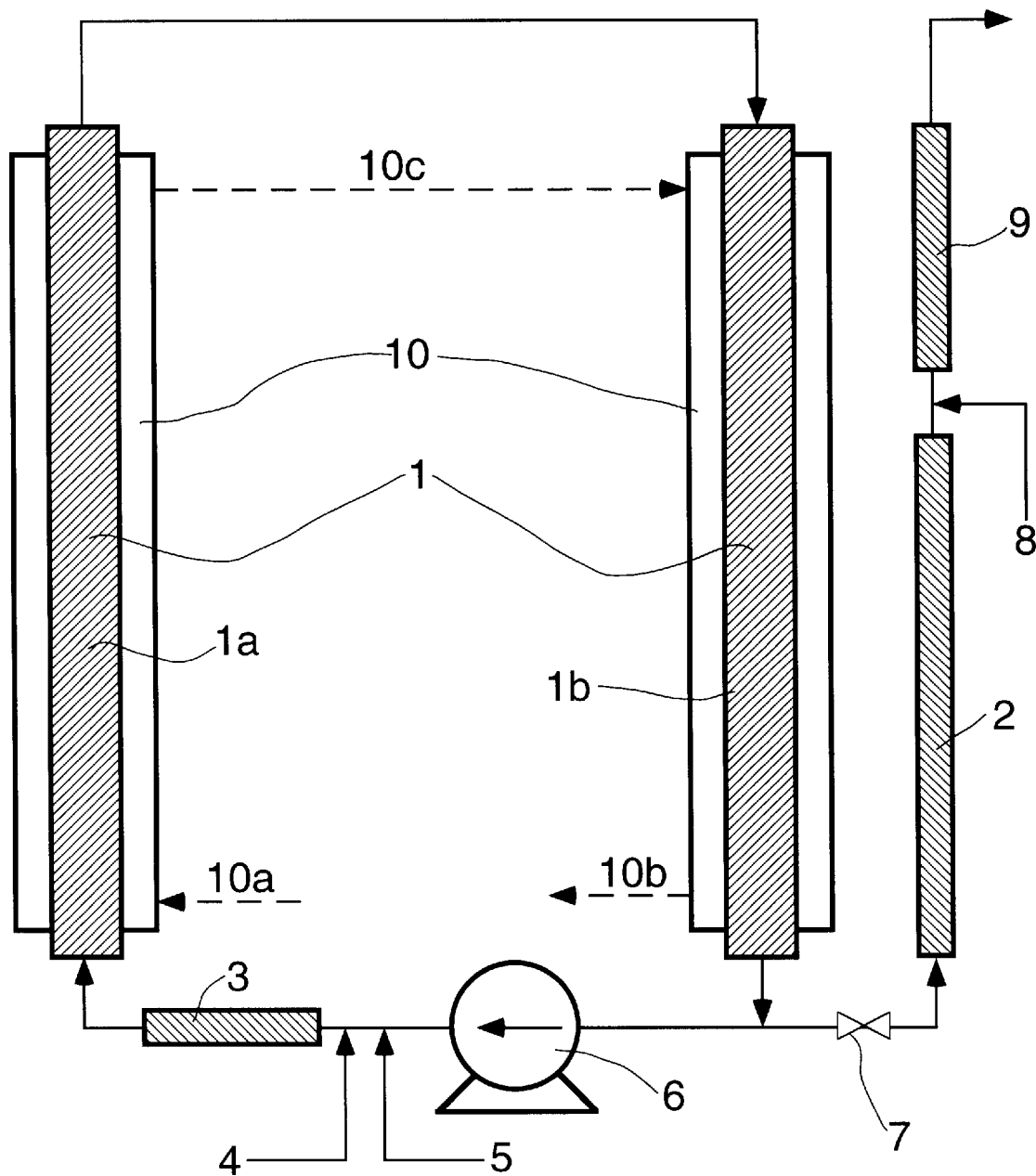

PREPARATION OF POLYSTYRENE BY CONTINUOUS ANIONIC POLYMERIZATION

The present invention relates to a continuous process for preparing polystyrene, in particular clear glass-like polystyrene, by anionic polymerization of styrene in a circulation reactor.

The continuous anionic polymerization of styrene has been described many times. It can theoretically be carried out either isothermally or adiabatically or under any operating conditions lying between these two extremes.

U.S. Pat. No. 4,883,846 describes the adiabatic method which achieves high conversions in small reaction spaces and in which very high final temperatures occur if a high monomer concentration is selected, since the anionic polymerization is known to proceed on its own to complete conversion. The high temperatures occurring can lead to damage to the polymers which have already been formed and lead to interference with the course of the reaction. DE-A1-42 35 980 and DE-A1-43 27 495 are also concerned with adiabatically operated process variants.

U.S. Pat. No. 3,035,033 and EP-A1-176 611 propose the continuous anionic polymerization of styrene at a residence time of at least one to three hours in a loop reactor, vis. a closed-loop tube reactor which at this residence time behaves as an ideal stirred reactor, i.e. achieves virtually complete backmixing. In this method, the reaction can be controlled well, but the poor utilization of the reactor volume (low space-time yield; STY) is a disadvantage of the process.

U.S. Pat. No. 4,442,273 describes a specific tube reactor in which the continuous anionic polymerization of styrene can be operated advantageously, but which has a complicated construction and is therefore expensive.

It is an object of the present invention to provide a process for the continuous anionic polymerization of styrene which is, in particular, economical in respect of the possible space-time yield (STY) and the plant costs, in which the molecular weight distribution of the desired polymers can be influenced over a relatively wide range without multiple metering-in of the monomers or the initiator, (cf. DE-A1-42 35 786) and in which only little low molecular weight polymer (oligomers) is formed.

We have found that this object is achieved by a process of the generic type mentioned in the introduction in which the styrene monomer is fed to an essentially isothermally operated reactor ("circulation reactor") which is configured as a closed tube loop, with the circulation velocity of the reaction mixture and the mean residence time being set such that the monomer conversion in the tube loop reaches at least 50% and the polymerization is completed in an essentially backmixing-free tube reactor.

The temperature in the circulation reactor is advantageously set to a temperature in the range from 30 to 100° C. The temperature in the downstream tube reactor can, for example, likewise be from 30 to 100° C.; in many cases it can be advantageous not to continue cooling in this section of the plant (more or less adiabatic operation), since only a residual conversion is to take place, advantageously at as high as possible a rate.

The circulation reactor generally has no internal fittings or only those which promote heat exchange with the wall or which promote backmixing. The tube reactor which serves as the after-reactor is, if necessary, provided with internal fittings which favor plug flow, i.e. made possible essentially backmixing-free operation. It is possible to use, for example, the currently available mixers of the type SMX or SMXL (Gebr. Sulzer AG, Winterthur, Switzerland), Kenix mixers (Chemineer Ltd. West Meadows, U.K.) or SMR reactors (Sulzer), or a plurality of parallel tube sections (tube bundles) are used in place of an individual tube.

To ensure operation of the circulation reactor which comes as close as possible to isothermal behavior, this reactor should have a specific cooling area of at least 50 $m^2$ per $m^3$ of reactor volume and be constructed such that fresh reaction mixture continues to come into contact with the cooling surface, i.e. the walls or other heat exchange surfaces.

The reaction advantageously takes place in solution, with use being made of the solvents customary for the anionic polymerization, for example pentane, cyclohexane, methylcyclohexane, toluene, ethylbenzene or xylene. However, the monomer or polymer concentration can also be high, e.g. up to a mass fraction of about 0.8 and should generally not be below 0.3 if the process is to remain economical.

The operating pressure is not critical; it can be matched as required to the properties of the reaction mixture, e.g. be up to 50 bar. Atmospheric pressure can generally be employed.

Suitable initiators are the appropriate customary alkali metal alkyls, in particular lithium alkyls having an alkyl radical of from 1 to 8 carbon atoms. Preference is given to n-butyllithium or s-butyllithium.

Construction and operation of an experimental plant.

BRIEF DESCRIPTION OF THE DRAWING

The FIGURE schematically shows an arrangement comprising two reaction spaces 1 and 2 which is suitable according to the present invention. The circulation reactor 1 comprises two individual tubes 1a and 1b each having a length of 4 m and a diameter of 5 cm, which are equipped with Kenics mixers and together with a mixing section 3 for the mixing-in of the feeds 4, 5 of monomer or initiator solution and a circulation pump 6 form a circulation reactor. This can be operated at a temperature in the range from 30 to 100° C. The cooling area which is in this case formed exclusively by the tube walls is above 50 $m^2$ per $m^3$ of reactor volume.

The circulation reactor 1 is separated from the tube reactor 2 (after-reaction section) by a pressure maintenance valve 7. The tube reactor 2 is likewise fitted with Kenics mixers to ensure plug flow.

Downstream of the after-reactor 2 there is provided an inlet 8 and a mixing section 9 for mixing-in an agent by means of which the still reactive chain ends of the "living" polymer can be inactivated. The arrangement is completed by a circuit 10a, 10b, 10c for supplying the temperature-controller jacket 10 of the circulation reactor and the necessary pipe connections between the essential components (not numbered in the FIGURE). The after-reactor 2 is, if necessary, likewise fitted with means of controlling the temperature (not shown in the FIGURE).

EXAMPLE 1

TABLE 1a

| Process parameters | | |
|---|---|---|
| Operating conditions | Reactor 1 | Reactor 2 |
| $C_{monomer,0,total}$[1] [kmol/m$^3$] | 4.0 | |
| $C_{Initiator}$[2] [mol/m$^3$] | 2.2 | |
| Conversion | 0.64 | |
| Polymer mass fraction | 0.31 | ~0.50 |
| Residence time [min] | 25.2 | 8 |
| Temperature, mean [°C] | 35 | |
| Temperature, exit [°C] | | 103 |
| Circulation ratio | 15.3 | |

[1] Feed, based on total feed; cyclohexane is used as solvent, likewise in the following example
[2] for $P_n$ ~1800

Result Example 1

| | |
|---|---|
| Product output [kg · h$^{-1}$] | 15.1 |
| Space-time yield [kg · m$^{-3}$·h$^{-1}$] | 755 |
| $P_w$[3] | 2200 |
| Nonuniformity U[4] | 0.2 |

[3] A weight average degree of polymerization, determined by gel chromatography
[4] $P_w/P_n - 1$

EXAMPLE 2

TABLE 2a

| Process parameters | | |
|---|---|---|
| Operating conditions | Reactor 1 | Reactor 2 |
| $C_{Monomer,0,total}$[1] [kmol/m$^3$] | 4.1 | |
| $C_{Initiator}$[2] [mol/m$^3$] | 1.8 | |
| Conversion | 0.74 | |
| Polymer mass fraction | 0.37 | ~0.50 |
| Residence time [min] | 25.0 | 8 |
| Temperature, mean [°C] | 49 | |
| Temperature, exit [°C] | | 99 |
| Circulation ratio | 15.3 | |

[1] Feed, based on total feed; cyclohexane is used as solvent, likewise in the following example
[2] for $P_n$ ~2200

Result Example 2

| | |
|---|---|
| Product output [kg · h$^{-1}$] | 15.2 |
| Space-time yield [kg · m$^{-3}$ · h$^{-1}$] | 760 |
| $P_w$[3] | 2850 |
| Nonuniformity U[4] | 0.3 |

[3] A weight average degree of polymerization, determined by gel chromatography
[4] $P_w/P_n - 1$

We claim:

1. A process for preparing polystyrene by continuous anionic polymerization of styrene monomer by means of a metal alkyl catalyst, wherein the styrene monomer is fed to a first reactor, wherein the velocity of the reaction mixture and the residence time in the first reactor are set such that the monomer conversion reaches at least 50%, and the polymerization is completed in a second reactor, and wherein the first reactor is a circulation reactor configurated as a closed loop and operated essentially isothermally, and the second reactor is a tube reactor which is operated essentially backmixing-free.

2. The process defined in claim 1, wherein the first reactor is set to a temperature in the rage of from 30 to 100° C.

3. The process defined in claim 1, wherein the first reactor has internal fittings which promote backmixing.

4. The process defined in claim 1, wherein the first reactor has a specific cooling area of at least 50 m$^2$ per m$^3$ of the reactor volume.

5. The process defined in claim 1, wherein the first reactor has internal fittings which promote the heat exchange.

\* \* \* \* \*